United States Patent [19]

Kurkowski et al.

[11] Patent Number: 5,707,147
[45] Date of Patent: Jan. 13, 1998

[54] HOT GAS FLOW THERMOCOUPLE TEST SYSTEM

[75] Inventors: Leonard S. Kurkowski; Robert K. Foderaro, both of San Antonio, Tex.

[73] Assignee: The United States of America as represented by the Secretary of the Air Force, Washington, D.C.

[21] Appl. No.: 682,897

[22] Filed: Jul. 3, 1996

[51] Int. Cl.⁶ .......................... G01K 15/00; G01K 19/00
[52] U.S. Cl. .............................. 374/1; 374/57; 73/865.6
[58] Field of Search ........................ 374/1, 57, 121, 374/130, 135, 179, 208; 136/290; 73/865.6, 866.4, 117.1

[56] References Cited

U.S. PATENT DOCUMENTS

| | | |
|---|---|---|
| Re. 32,625 | 3/1988 | Schwarz et al. ................ 374/57 |
| 2,939,316 | 6/1960 | Beecher et al. ................ 73/117.1 |
| 3,488,681 | 1/1970 | Mita et al. ................ 374/57 |
| 3,545,252 | 12/1970 | Springfield et al. ................ 73/865.6 |
| 4,115,998 | 9/1978 | Gilbert et al. ................ 374/1 |
| 4,834,550 | 5/1989 | Yano et al. ................ 374/57 |
| 4,854,727 | 8/1989 | Pecot et al. ................ 374/1 |
| 4,901,257 | 2/1990 | Chang et al. ................ 374/1 |

*Primary Examiner*—G. Bradley Bennett
*Attorney, Agent, or Firm*—Bobby D. Scearce; Thomas L. Kundert

[57] ABSTRACT

System and method for high temperature testing of thermocouples are described wherein a fuel burning combustion chamber generates a hot gaseous flow through a transparent chamber at a selected test temperature in the range of about 1400° F. to 2150° F., a test thermocouple being disposed within the transparent chamber, the output of the test thermocouple being measured against a reference thermocouple and an optical pyrometer.

14 Claims, 2 Drawing Sheets

HOT GAS FLOW THERMOCOUPLE TEST SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to high temperature measuring systems and methods, and more particularly to system and method for accurately and reliably testing jet engine turbine inlet thermocouples.

In the testing of thermocouples used for measuring operating temperatures of gas turbine engines, such as the turbine inlet temperature, correlation of temperature as measured by the thermocouple with engine performance is required. Conventional thermocouple testing systems and methods are limited substantially to static temperature tests and simplistic go/no-go electrical and physical tests which cannot be accurately or reliably correlated to engine performance.

The invention solves or substantially reduces in critical importance problems with prior art systems and methods by providing a stable and reliable test system and repeatable method for jet engine turbine inlet thermocouples under conditions which closely emulate engine conditions. In the practice of the invention, a fuel burning combustion chamber generates a hot gaseous flow through a transparent test chamber at a selected test temperature in the range of about 1400° F. to 2150° F., the test temperature being maintainable at ±1° F. A thermocouple under test is disposed within the transparent chamber and subjected to hot gaseous flow, normally at 1750±1° F., and the output of the thermocouple is measured against a reference thermocouple and an optical pyrometer. Utility of the invention was further demonstrated in prototype tests of turbofan augmentor ceramic coupons at temperatures from 1400° F. to 2150° F. and for testing T-38 aircraft fire detector sensors which maintain a hot gas path temperature up to about 2000° F.

It is therefore a principal object of the invention to provide an improved temperature measuring system and method.

It is a further object of the invention to provide a thermocouple testing system and method.

It is another object of the invention to provide system and method for testing thermocouples used within hot gaseous flow systems.

It is yet another object of the invention to provide system and method for accurately and reproduceably testing jet engine turbine inlet thermocouples.

These and other objects of the invention will become apparent as a detailed description of representative embodiments proceeds.

SUMMARY OF THE INVENTION

In accordance with the foregoing principles and objects of the invention, system and method for high temperature testing of thermocouples are described wherein a fuel burning combustion chamber generates a hot gaseous flow through a transparent chamber at a selected test temperature in the range of about 1400° F. to 2150° F., a test thermocouple being disposed within the transparent chamber, the output of the test thermocouple being measured against a reference thermocouple and an optical pyrometer.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
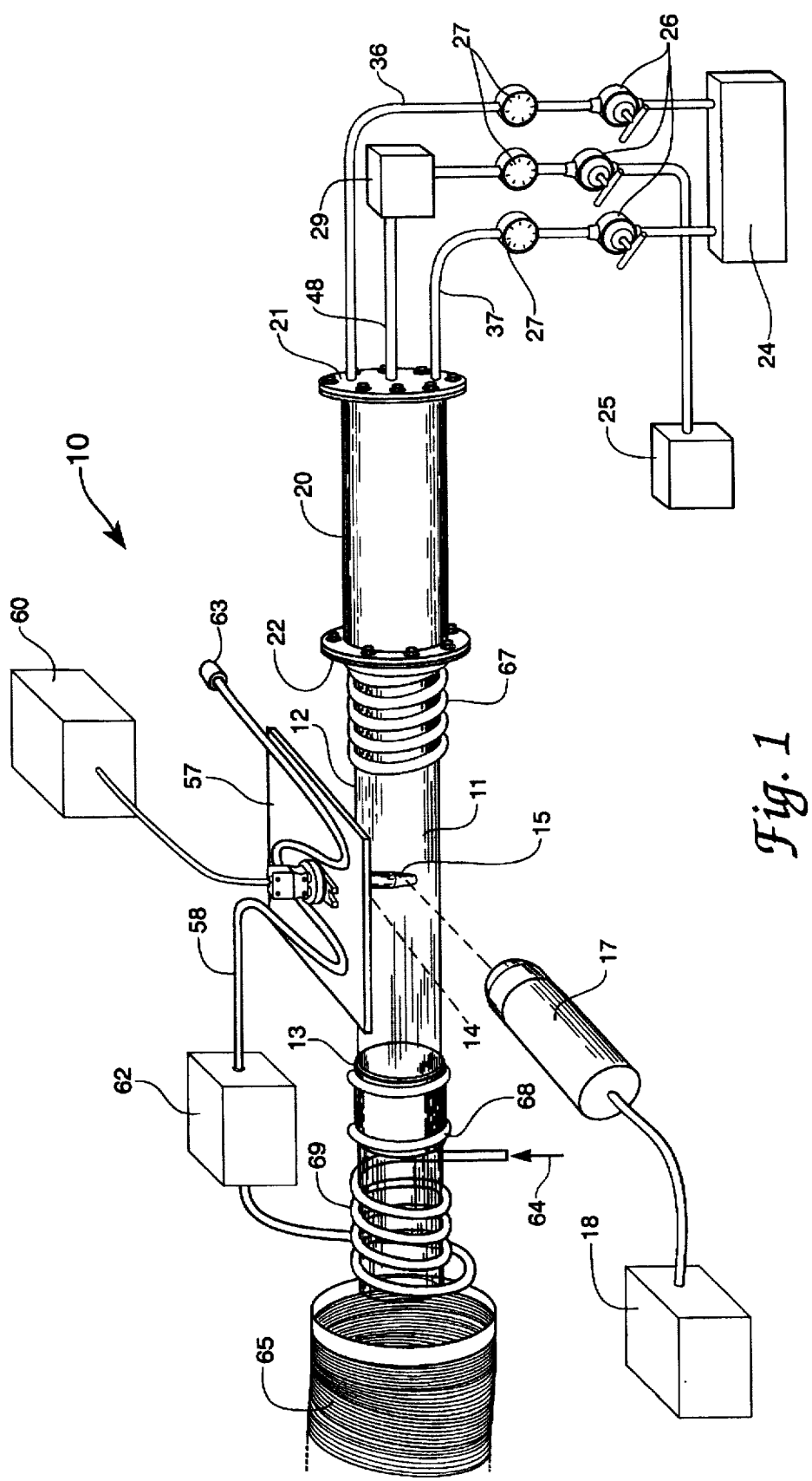
FIG. 1 is a schematic block diagram of the essential components of the thermocouple test system of the invention and useful in the practice of the method thereof.

Referring now to the drawings, FIG. 1 shows a schematic block diagram of the essential components of the thermocouple tester system 10 of the invention and useful in the practice of the method thereof. In system 10, a generally tubular shaped transparent chamber 11 having in inlet end 12 and an outlet end 13 is provided with an opening 14 in one side for receiving thermocouple 15 for testing. Chamber 11 is constructed of high temperature resistant tempered glass, such as is commercially available as VYCOR®, Corning Corp. P/N 744385. Transparency of chamber 11 allows direct viewing of thermocouple 15 during testing. Optical pyrometer 17 is disposed substantially as shown in FIG. 1 for detecting radiation from thermocouple 15 and is operatively connected to associated electronics 18 in order to provide a direct reading of the temperature of thermocouple 15 under test. Optical pyrometer 17 used in a system 10 built in demonstration of the invention was a MIKRON® Model M67S infrared thermometer (Mikron Instrument Co., Inc., Wyckoff N.J.), although other equivalent makes and models may be used as would occur to a skilled artisan practicing the invention, the specific selection not considered limiting of the invention.

Combustion chamber 20 having an inlet end 21 is operatively connected at its outlet end 22 to inlet end 12 of chamber 11. The structure and operation of combustion chamber 20 is discussed in more detail below in relation to FIG. 2. Inlet end 21 of combustion chamber 20 is connected to a source 24 of pressurized air and to a source 25 of fuel through suitable valving 26 and flow control means (regulators) 27. In the operation of system 10, air is supplied from source 24 at about 10 to 42 psi (nominally 10 psi), and fuel is supplied from source 25 at about 0 to 28 psi (nominally 10 psi). During operation, fuel from source 25 is burned within combustion chamber 20 in order to provide a flow of hot combustion gases through chamber 11 past test thermocouple 15 simulating the temperature and gaseous flow conditions at a jet engine turbine inlet. In the practice of the invention, any suitable fuel may be used to provide the temperature and gaseous flow conditions for testing thermocouple 15. In demonstration of the invention, natural gas and aviation fuel (JP-5) were used, although other fuels may be used as would occur to the skilled artisan guided by these teachings, selection of a specific fuel not considered limiting of the invention. Suitable control of fuel/air mixtures within combustion chamber 20 resulted in temperatures of the combustion gas flow against thermocouple 15 controllable within the range of about 1400° F. to 2150° F. with an accuracy of about ±1° F. Hot combustion gas flow temperature for a typical thermocouple 15 test was about 1750 ±1° F. Use of natural gas fuel allowed operation at a high combustion chamber 20 pressure, resulted in clean and efficient combustion and presented an optically clear view of thermocouple 15 without combustion residue on the interior surface of chamber 11. In system 10 built in demonstration of the invention, pressure supercharger 29 was disposed between the source of natural gas and combustion chamber 20 in order to provide enhanced gas pressure and optimum resultant combustion temperature. Partial mixing of fuels allowed a combustion temperature of up to about 2500° F., which exceeds the temperature to which thermocouple 15 is exposed in normal turbine operation.

Figure 2:
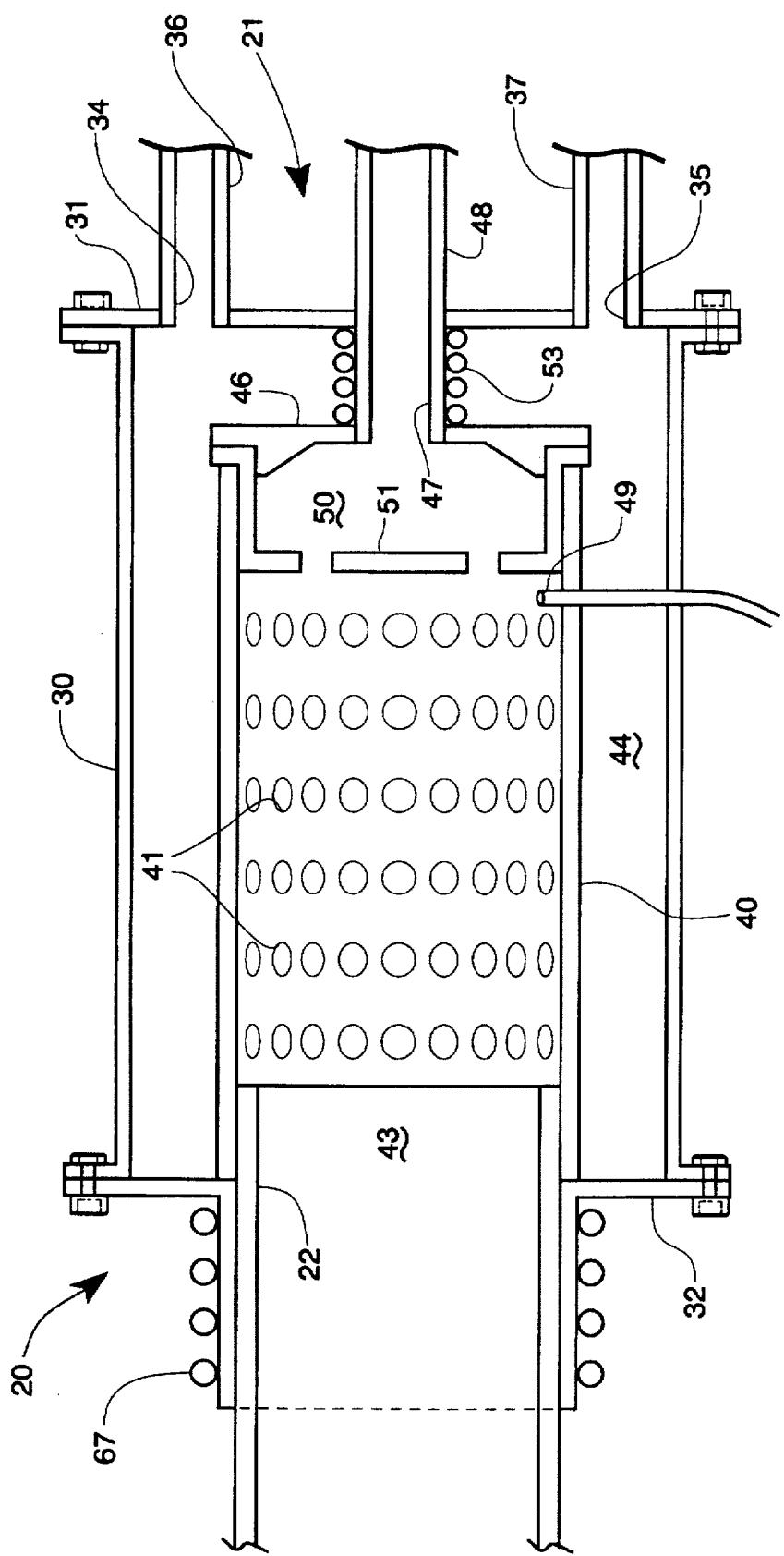
FIG. 2 is an axial sectional view of the combustion chamber of the FIG. 1 system.

Referring now to FIG. 2, shown therein is an axial sectional view of combustion chamber 20 of the FIG. 1 demonstration system. Combustion chamber 20 comprised an outer substantially cylindrically shaped housing 30, defined between flanged members 31,32 at respective inlet and outlet ends 21,22. Inlet openings 34,35 are defined in flanged member 31 and communicate with source 24 of pressurized air through respective conduits 36,37 for conducting air into combustion chamber 20 for burning fuel therewithin. Inner housing 40 is disposed within and coaxial with housing 30 and has a plurality of circumferentially and axially spaced holes 41 through which the interior 43 of housing 40 communicates with annular space 44 defined between housings 30,40. Inlet end 46 of chamber 40 has inlet opening 47 defined therein and communicates with source 25 of fuel through conduit 48. Chamber 50 is defined between inlet end 46 of housing 40 and centrally disposed baffle 51 by which the incoming fuel flow through inlet opening 47 is diffused circumferentially and directed through housing 40 near the interior surface thereof. Igniter 49 may be disposed within housing 40 at any suitable position such as suggested in FIG. 2, and connected to suitable power supply (not shown) through suitable switching (also not shown). Conduit 48 may have disposed therearound a heating coil 53 connected to a suitable source of power (not shown) for preheating fuel conducted through conduit 48 into inner housing 40.

In order to best simulate the operating environment of thermocouple 15 within an engine, thermocouple 15 was mounted on a platform 57 (FIG. 1) having conduit 58 thereon for conducting hot gas in heat exchange relationship with platform 57 to maintain the temperature thereof at substantially the operating temperature (about 600° F.) of the engine housing at the point at which a thermocouple 15 is mounted. Thermocouple 15 is connected to multipoint thermocouple output indicator 60 at platform 57 as suggested in FIG. 1. Temperature control of platform 57 is effected by passage of hot gas (usually air) from a source 62 through conduit 58 and exhaust orifice 63. The flow of hot air (viz., about 0.5 cfm at about 600° F.) through conduit 58 may be provided by ambient air 64 drawn through and preheated within coil 69 heated by radiated energy from chamber 11.

Exhaust duct 65 is disposed in alignment with outlet end 13 of chamber 11 for exhausting combustion gases from system 10. Exhaust duct 65 is normally connected to a blower or fan (not shown) in order to maintain a negative pressure (nominally about −6 to −10 inches of water) within duct 65 near outlet 13 of chamber 11. Water cooled coils 67,68 may be disposed around the outlet end of combustion chamber 20, around chamber 11 and the outlet of chamber 11 for cooling the surface of chamber 11 so as to prevent overheating of the transparent material (glass) comprising chamber 11.

In the testing of a thermocouple in the practice of the invention, a reference (calibration) thermocouple is first installed within chamber 11 (see FIG. 1) in the place of thermocouple 15. Air flow from source 24 is then initiated, fuel from source 25 is injected and ignited and the system is allowed to equilibrate by adjustment of the fuel/air ratio until the desired test temperature is reached as indicated by the reference thermocouple and optical pyrometer 17, and the temperature of platform 57 is stabilized at a desired level. The reference thermocouple is then removed and replaced with a test thermocouple 15. The output of the test thermocouple is then recorded after the system stabilizes.

The invention therefore provides test system and method for thermocouples used within hot gas flow systems, such as in the measurement of jet engine turbine inlet operating temperatures. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A system for testing thermocouples at high temperature, comprising:
   (a) a source of fuel and a source of pressurized air;
   (b) a combustion chamber having first and second ends, said first end including first and second inlet openings operatively connected to respective said source of fuel and said source of air, for burning said fuel and generating a flow of hot combustion gases through said second end of said combustion chamber;
   (c) a generally tubular shaped transparent chamber having an inlet at a first end thereof and and an outlet at a second end thereof, said transparent chamber operatively connected at said inlet thereof to said outlet of said combustion chamber for conducting said flow of hot combustion gases through said transparent chamber;
   (d) means defined in a wall of said transparent chamber for inserting a thermocouple into said flow of hot combustion gases; and
   (e) an optical pyrometer disposed near said transparent chamber for measuring the temperature of said thermocouple.

2. The system of claim 1 wherein said transparent chamber comprises high temperature resistant tempered glass.

3. The system of claim 1 wherein said source of fuel comprises natural gas or aviation fuel.

4. The system of claim 1 wherein said hot gaseous flow is in the temperature range of about 1400° F. to 2150° F.

5. The system of claim 4 wherein said temperature of said hot gaseous flow is about 1750° F.

6. The system of claim 1 further comprising means defining a platform for supporting said thermocouple, said platform having a conduit thereon for conducting hot gas in heat exchange relationship with said platform for maintaining the temperature of said platform at about 600° F.

7. The system of claim 1 wherein said combustion chamber comprises:
   (a) an outer substantially cylindrically shaped housing defined between first and second flanged members, said first flanged member including said first and second inlet openings operatively connected to respective said source of fuel and said source of air;
   (b) an inner housing disposed within and substantially coaxial with said outer housing, said inner housing having a plurality of circumferentially and axially spaced holes defined in the wall thereof through which the interior of said inner housing communicates with an annularly shaped space defined between said inner housing and said outer housing, said inner housing having an inlet opening communicating with said first inlet opening in said first flanged member for conducting said fuel into said inner housing, and a baffle near said inlet of said inner housing for diffusing flow of said fuel into said inner housing; and (c) an igniter disposed within said combustion chamber for igniting mixtures of said fuel and air therewithin.

8. The system of claim 7 wherein said further comprising a heating coil disposed around said inlet of said inner housing for preheating fuel flowing into said inner housing.

9. A system for testing thermocouples at high temperature, comprising:

(a) a source of fuel and a source of pressurized air;

(b) a combustion chamber for burning said fuel and generating a flow of hot combustion gases therethrough, said combustion chamber having first and second ends and including an outer substantially cylindrically shaped housing defined between first and second flanged members, said first flanged member including first and second inlet openings operatively connected to respective said source of fuel and said source of air, an inner housing disposed within and substantially coaxial with said outer housing, said inner housing having a plurality of circumferentially and axially spaced holes defined in the wall thereof through which the interior of said inner housing communicates with an annularly shaped space defined between said inner housing and said outer housing, said inner housing having an inlet opening communicating with said first inlet opening in said first flanged member for conducting said fuel into said inner housing, and a baffle near said inlet of said inner housing for diffusing flow of said fuel into said inner housing, and an igniter for igniting mixtures of said fuel and air within said combustion chamber;

(c) a generally tubular shaped transparent chamber having an inlet at a first end thereof and and an outlet at a second end thereof, said transparent chamber operatively connected at said inlet thereof to said second end of said combustion chamber for conducting said flow of hot combustion gases through said transparent chamber;

(d) means defined in a wall of said transparent chamber for inserting a thermocouple into said flow of hot combustion gases; and (e) an optical pyrometer disposed near said transparent chamber for measuring the temperature of said thermocouple.

10. The system of claim 9 wherein said transparent chamber comprises high temperature resistant tempered glass.

11. The system of claim 9 wherein said source of fuel comprises natural gas or aviation fuel.

12. The system of claim 9 wherein said hot gaseous flow is in the temperature range of about 1400° F. to 2150° F.

13. The system of claim 12 wherein said temperature of said hot gaseous flow is about 1750° F.

14. The system of claim 9 further comprising means defining a platform for supporting said thermocouple, said platform having a conduit thereon for conducting hot gas in heat exchange relationship with said platform for maintaining the temperature of said platform at about 600° F.

* * * * *